(12) United States Patent
Abe et al.

(10) Patent No.: US 10,040,538 B2
(45) Date of Patent: Aug. 7, 2018

(54) JOINT, AND AIRCRAFT STRUCTURE

(71) Applicant: MITSUBISHI HEAVY INDUSTRIES, LTD., Tokyo (JP)

(72) Inventors: Toshio Abe, Tokyo (JP); Kiyoka Takagi, Tokyo (JP); Takayuki Koyama, Tokyo (JP); Kazuaki Kishimoto, Tokyo (JP); Kouichi Saito, Aichi (JP); Takashi Ishida, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 30 days.

(21) Appl. No.: 14/916,311

(22) PCT Filed: Jun. 16, 2014

(86) PCT No.: PCT/JP2014/065864
§ 371 (c)(1),
(2) Date: Mar. 3, 2016

(87) PCT Pub. No.: WO2015/049898
PCT Pub. Date: Apr. 9, 2015

(65) Prior Publication Data
US 2016/0194071 A1 Jul. 7, 2016

(30) Foreign Application Priority Data
Oct. 2, 2013 (JP) .................. 2013-207662

(51) Int. Cl.
*B64C 3/18* (2006.01)
*B64C 3/26* (2006.01)
(Continued)

(52) U.S. Cl.
CPC ................ *B64C 3/26* (2013.01); *B29C 65/48* (2013.01); *B29C 65/5057* (2013.01);
(Continued)

(58) Field of Classification Search
CPC ... B29C 66/71; B29C 66/721; B29C 66/7212; B64C 3/18; B64C 3/182
See application file for complete search history.

(56) References Cited

U.S. PATENT DOCUMENTS 6,261,395 B1 7/2001 Duffy
6,276,866 B1 8/2001 Rutan
(Continued)

FOREIGN PATENT DOCUMENTS

CN 101395461 3/2009
CN 102806665 12/2012
(Continued)

OTHER PUBLICATIONS

Notification of Reasons for Rejection issued Jan. 10, 2017 in corresponding Japanese Application No. 2013-207662 (with English translation).
(Continued)

*Primary Examiner* — Daniel J Wiley
(74) *Attorney, Agent, or Firm* — Wenderoth, Lind & Ponack L.L.P.

(57) ABSTRACT

A joint (20) joins a plate member (26) with a preform (22), wherein an inclined part (28), which is inclined relative to a surface that is orthogonal to the direction in which a tensile load is applied to the plate member (26), is formed on a surface (25) that joins with the preform (22). Moreover, an indented part (38) corresponding to the shape of the inclined part (28) is formed on the preform (22) so that the inclined part (28) of the joint (20) is embedded into the indented part (38). The joint (20) is embedded in and bonded to the preform (22).

7 Claims, 17 Drawing Sheets

(51) Int. Cl.
  *B29C 65/48* (2006.01)
  *B29C 65/50* (2006.01)
  *B29C 65/00* (2006.01)
  *F16B 11/00* (2006.01)
  *B29L 31/30* (2006.01)

(52) U.S. Cl.
  CPC ...... *B29C 65/5064* (2013.01); *B29C 65/5071* (2013.01); *B29C 65/5085* (2013.01); *B29C 66/112* (2013.01); *B29C 66/114* (2013.01); *B29C 66/12443* (2013.01); *B29C 66/12464* (2013.01); *B29C 66/131* (2013.01); *B29C 66/301* (2013.01); *B29C 66/43441* (2013.01); *B29C 66/524* (2013.01); *B29C 66/5326* (2013.01); *B29C 66/721* (2013.01); *B64C 3/18* (2013.01); *F16B 11/006* (2013.01); *B29C 66/12441* (2013.01); *B29C 66/7212* (2013.01); *B29L 2031/3076* (2013.01)

(56) References Cited

U.S. PATENT DOCUMENTS

| | | | |
|---|---|---|---|
| 6,374,570 | B1 | 4/2002 | McKague, Jr. |
| 6,749,155 | B2 | 6/2004 | Bergmann |
| 6,849,150 | B1 | 2/2005 | Schmidt |
| 7,555,873 | B2 | 7/2009 | Kilwin et al. |
| 7,690,164 | B2 | 4/2010 | Walker et al. |
| 7,914,223 | B2 | 3/2011 | Wood et al. |
| 8,272,618 | B2 | 9/2012 | Kilwin et al. |
| 8,403,586 | B2 | 3/2013 | Wood et al. |
| 2002/0053175 | A1 | 5/2002 | McKague, Jr. et al. |
| 2008/0105661 | A1 | 5/2008 | Kirkwood et al. |
| 2008/0118683 | A1 | 5/2008 | Xie |
| 2009/0093976 | A1 | 4/2009 | Vergnes et al. |
| 2013/0133171 | A1 | 5/2013 | Miguez Charines et al. |
| 2013/0164489 | A1 | 6/2013 | Gaitonde et al. |
| 2013/0209746 | A1 | 8/2013 | Reighley et al. |
| 2013/0266756 | A1 | 10/2013 | Zuardy et al. |
| 2014/0000381 | A1 | 1/2014 | Zuardy et al. |
| 2014/0050884 | A1 | 2/2014 | Zuardy et al. |
| 2015/0030380 | A1 | 1/2015 | Wilson et al. |
| 2015/0259079 | A1 | 9/2015 | Kirkwood et al. |

FOREIGN PATENT DOCUMENTS

| | | |
|---|---|---|
| CN | 103118940 | 5/2013 |
| CN | 103124673 | 5/2013 |
| EP | 1 927 732 | 6/2008 |
| JP | 2001-501885 | 2/2001 |
| JP | 2004-507629 | 3/2004 |
| JP | 2008-144757 | 6/2008 |
| RU | 2144485 | 1/2000 |
| RU | 12819 | 2/2000 |
| WO | 02/16784 | 2/2002 |
| WO | 2013/108013 | 7/2013 |

OTHER PUBLICATIONS

Extended European Search Report dated Aug. 12, 2016 in corresponding European Application No. 14851251.0.
International Search Report dated Jul. 8, 2014 in corresponding International Application No. PCT/JP2014/065864.
Written Opinion of the International Searching Authority dated Jul. 8, 2014 in corresponding International Application No. PCT/JP2014/065864.
First Office Action dated Oct. 31, 2016 in corresponding Chinese Application No. 201480048925.1 (with English translation).

JOINT, AND AIRCRAFT STRUCTURE

TECHNICAL FIELD

The present invention relates to a joint, and an aircraft structure.

BACKGROUND ART

In the aircraft field, the scope of application of composite materials such as, for example, carbon fiber reinforced plastics (CFRP) has expanded to the primary structure.

Also, utilizing the advantage of light weight of composite materials, it is desirable that joints do not use fasteners, in order to achieve weight reduction of the structure.

The members inserted into joints are bonded using adhesive, and the joints are also bonded to the preform using adhesive. In this way, members are jointed to the preform.

Also, when assembling the structure, plate members that are joined to the preform must be positioned with high accuracy. In other words, if the joint is provided in advance on the preform, it is necessary to position the plate member with respect to the joint with high accuracy.

In Patent Document 1, a peg (projection) for positioning is provided on a side face of a plate member, and a slot into which the peg is fitted is provided on a side face of a joint, and positioning is carried out by inserting the plate member so that the peg of the plate member is fitted into the slot of the joint.

CITATION LIST

Patent Literature

Patent Document 1: U.S. Pat. No. 8,403,586

SUMMARY OF INVENTION

Technical Problem

In the structure disclosed in Patent Document 1, positioning can be carried out, but the bonding surface of the joint and the preform must have sufficient strength on the surface of the preform to which the joint is connected, with respect to a load acting on the member in the tensile direction (a load in the out-of-plane direction).

The bonding surface between the member and the preform is conventionally flat. However, when the bonding surface is flat, in some cases there is not sufficient strength with respect to loads in the out-of-plane direction.

In light of the foregoing, it is an object of the present invention to provide a joint and an aircraft structure that is capable of providing greater strength to the bonding surface of the joint and the preform.

Solution to Problem

In order to solve the problem described above, the joint and the aircraft structure according to the present invention utilize the following means.

A joint according to a first aspect of the present invention is a joint that connects a member to a preform, wherein an inclined part, which is inclined relative to a surface that is orthogonal to the direction in which a tensile load is applied to the plate material, is formed on a bonding surface with the preform, and the inclined part is embedded in the preform and bonded to the preform.

The joint according to this configuration joins the member to the preform. Also, the joint according to this configuration is formed with an inclined part on the bonding surface with the preform. The inclined part is inclined with respect to a plane that is perpendicular to the direction in which a tensile load is applied to the member. In other words, the inclined part is inclined with respect to the preform. On the other hand, an indented part corresponding to the shape of the inclined part is formed on the preform so that the inclined part of the joint is embedded into a bonding surface with the joint. In this way, the joint 20 is bonded to the preform with the inclined part embedded in the preform.

Here, the bond strength includes an out-of-plane direction strength, which is the strength in the tensile direction of the member (the out-of-plane direction). In other words, the out-of-plane direction strength is the strength against tensile loads applied to the member (out-of-plane direction loads). In addition, besides the out-of-plane direction strength, the bond strength is divided into an in-plane direction strength, which is the strength in the shear direction of the bonding layer (the in-plane direction).

Also, if the bonding surface is flat, the out-of-plane direction strength is perpendicular to the in-plane direction strength. Therefore, the theoretical bond strength with respect to out-of-plane direction loads is equal to the out-of-plane direction strength.

On the other hand, when the inclined part is formed in the bonding surface as in this configuration, the in-plane direction strength has a strength component in the out-of-plane direction. Therefore the theoretical bond strength against out-of-plane direction loads includes the sine component of the in-plane direction bond strength in addition to the out-of-plane direction bond strength.

In other words, the bond strength is greater when the inclined part is formed in the preform, compared with when the bonding surface is flat. In particular, when subjected to an out-of-plane direction load, the peak stress at the edge of the bonding surface is reduced compared with the case where the inclined part is not formed.

Therefore, with the present configuration, the strength of the bonding surface between the joint and the preform can be increased.

In the first aspect as described above, the surface opposite the bonding surface is inclined so that the thickness becomes smaller towards the edge than in the center.

In this configuration, the difference in stiffness between the joint and the preform is reduced compared with the case in which the surface opposite the bonding surface is not inclined, in other words for example the edge of the joint is perpendicular to the preform. Note that there is a concern over the reduction in strength of the edge of the joint because of inclination of the surface opposite the bonding surface. However, by forming the inclined part in the joint, the peak stress at the edge is reduced when subjected to an out-of-plane direction load, so damage to the edge is minimized.

In the first aspect as described above, the inclined part is formed with a plurality of inclined surfaces.

According to this configuration, the bond strength of the bonding surface can be made uniform.

In the first aspect as described above, the inclined part is formed with a plurality of inclined surfaces with different angles with respect to the preform.

According to this configuration, the strength of the bonding surface can be adjusted by changing the angle in accordance with the load expected to be applied to the joint.

In the first aspect as described above, the inclined part is formed with a single inclined surface.

According to this configuration, the strength of the bonding surface between the joint and the preform can be increased with a simple configuration.

The aircraft structure according to a second aspect of the present invention includes: a joint as described above; and a preform with an indented part corresponding to the shape of the inclined part, so that the inclined part of the joint is embedded therein. The joint is embedded in and bonded to the preform.

Advantageous Effects of Invention

The present invention has the advantageous effect that the strength of the bonding surface between the joint and the preform can be increased.

DESCRIPTION OF EMBODIMENTS

An embodiment of the joint and aircraft structure according to the present invention is described below with reference to the accompanying drawings.

Figure 1:
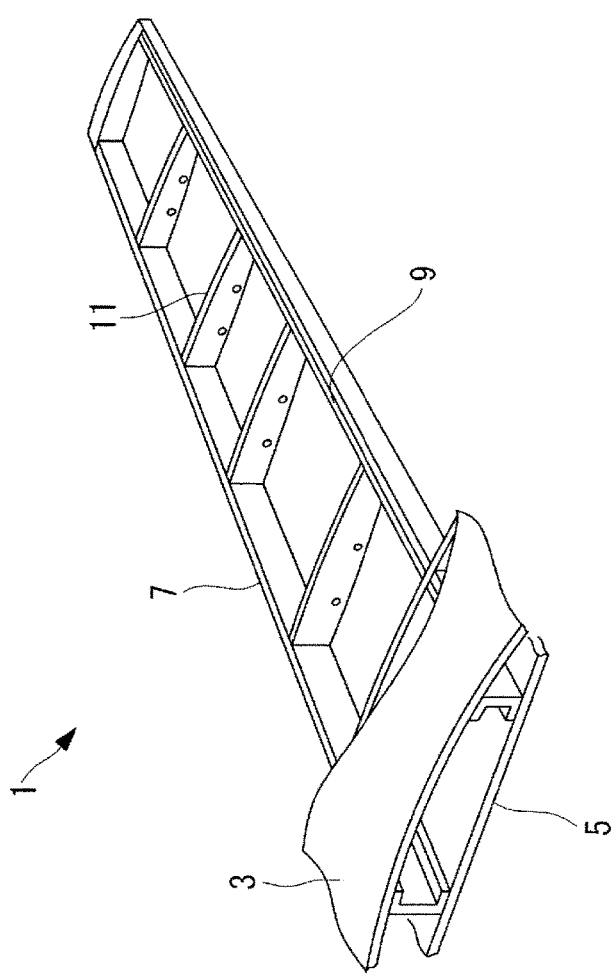
FIG. 1 is a perspective view illustrating a partially sectioned main wing of an aircraft.

FIG. 1 is a perspective view illustrating a partially sectioned main wing 1 of an aircraft.

The main wing 1 includes an upper skin 3, a lower skin 5, a forward spar 7, a rear spar 9, and a plurality of ribs 11.

The upper skin 3 and the lower skin 5 configure the outer shape of the main wing 1 and are thin plates also acting as aerodynamic surfaces. Along with the forward spar 7, the rear spar 9, and stringers (not illustrated), the upper skin 3 and the lower skin 5 partially bear tensile loads and compressive loads acting on the main wing 1.

As illustrated in FIG. 1, the forward spar 7 and the rear spar 9 are structural members that extend in the lengthwise direction of the main wing 1, and are disposed between the upper skin 3 and the lower skin 5.

A plurality of stringers, which are support members extending in the lengthwise direction of the main wing 1, is disposed on the inside face of the upper skin 3 or the lower skin 5, between the forward spar 7 and the rear spar 9.

As illustrated in FIG. 1, the ribs 11 are structural members extending in the widthwise direction of the main wing 1, and are disposed between the upper skin 3 and the lower skin 5. In other words, the ribs 11 are structural members extending in a direction roughly orthogonal to the forward spar 7 and the rear spar 9, and are plate-like members formed in the shape of the cross-sectional shape of the main wing 1.

Here, a joint 20 (see FIG. 2 and the like) according to the present embodiment is used, for example, in the connection between the upper skin 3 and the forward spar 7 and the rear spar 9, the connection between the lower skin 5 and the forward spar 7 and the rear spar 9, the connection between the ribs 11 and the forward spar 7 and the rear spar 9, and the like. Note that the joint 20 may be used in structures other than the main wing 1 of the aircraft.

Next, the joint 20 according to the present embodiment is described in detail.

Figure 2:
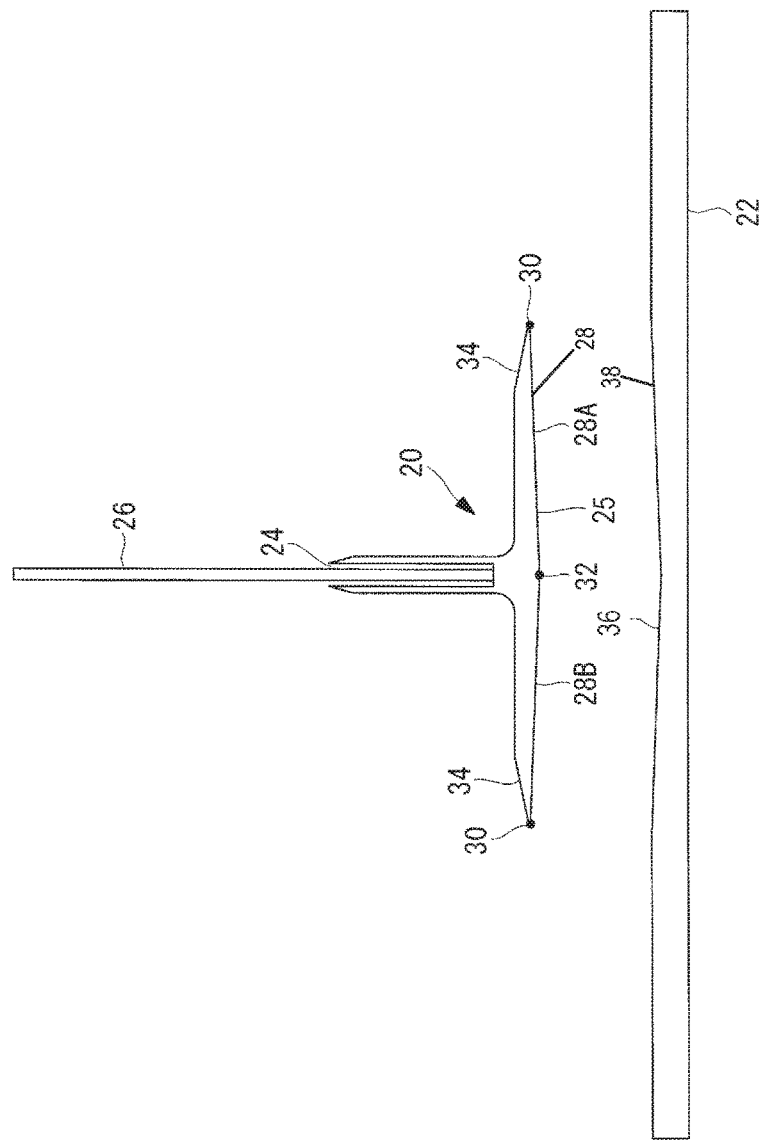
FIG. 2 is a side view illustrating the shape of the joint and the preform according to an embodiment of the present invention.
Figure 3:
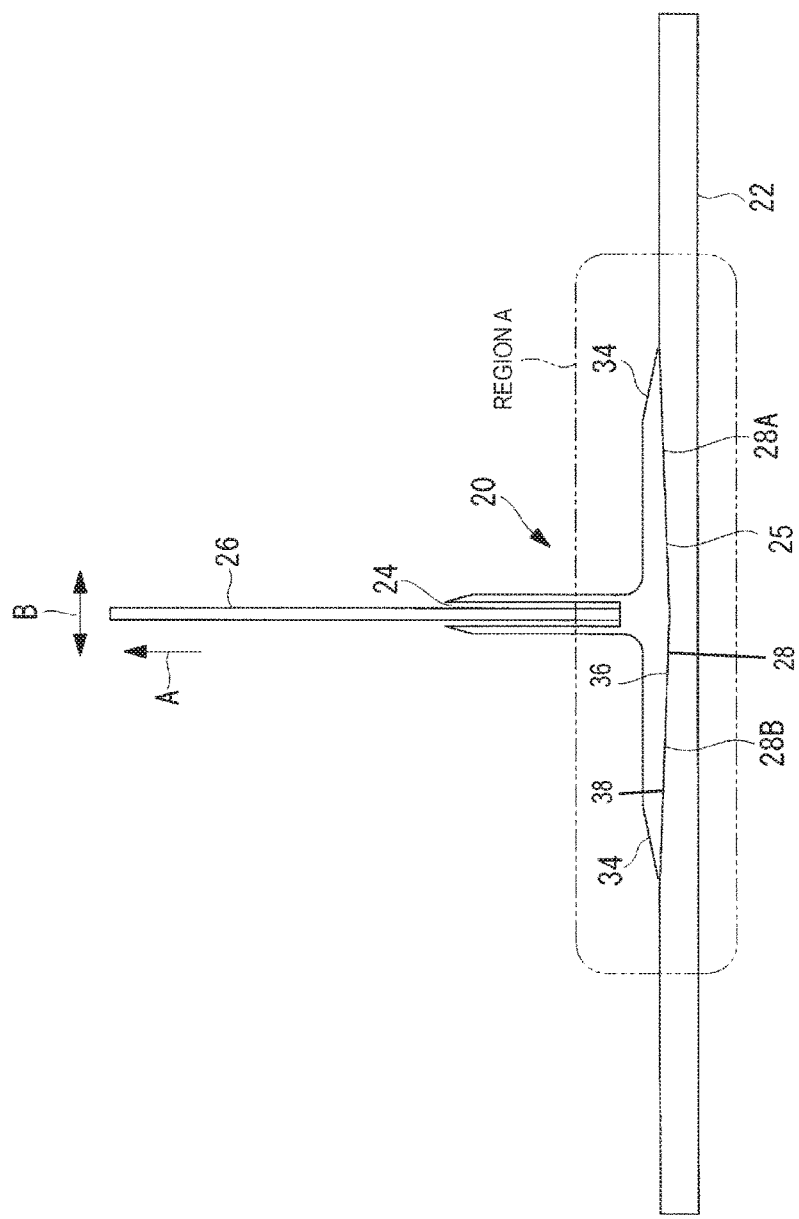
FIG. 3 is a side view illustrating the connected joint and preform according to an embodiment of the present invention.
Figure 4:
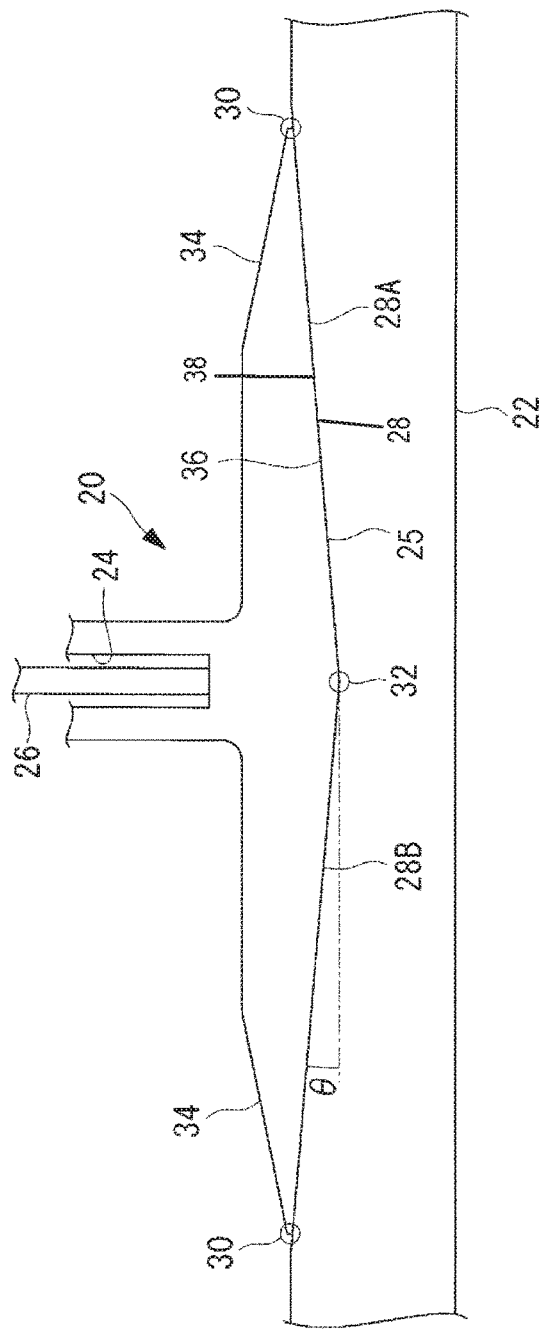
FIG. 4 is an enlarged view of the region A illustrated in FIG. 3.
Figure 5:
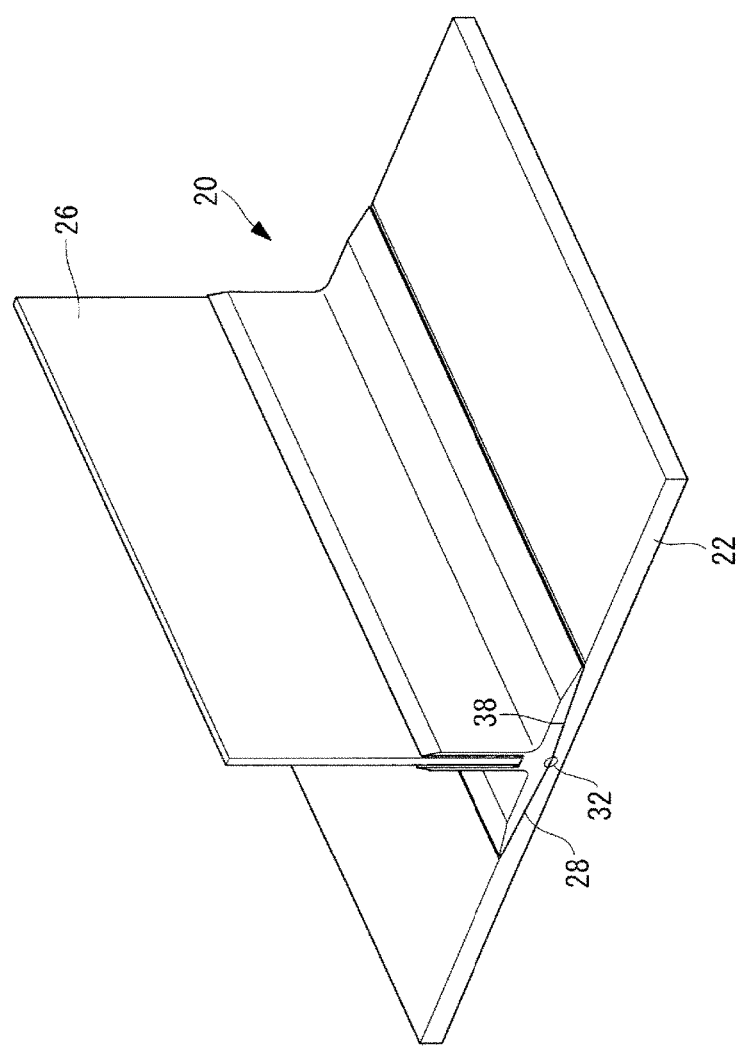
FIG. 5 is a perspective view illustrating the shape of the joint and the preform according to an embodiment of the present invention.

FIG. 2 is a side view illustrating the shape of the joint 20 and a preform 22, FIG. 3 is a side view illustrating the joint 20 and the preform 22 connected, FIG. 4 is an enlarged view of the region A illustrated in FIG. 3, and FIG. 5 is a perspective view illustrating the shape of the joint 20 and the preform 22.

The joint 20 according to the present embodiment is a so-called pi (π) shaped joint which is provided on the preform 22, and in which a groove 24 is formed.

The joint 20 is, for example, used in the body structure of an aircraft, and a member (a plate member 26 as an example in the present embodiment) that forms a part of the body structure is inserted into the groove 24. For example, the forward spar 7 or the rear spar 9 is the preform 22, and the rib 11 is the plate member 26.

Also, the plate member 26 is bonded to the joint 20 by filling the gap between the plate member 26 and the groove 24 with adhesive. On the other hand, the joint 20 is bonded to the preform 22 with adhesive. Note that there is no particular limitation on the method of bonding the preform 22 and the joint 20, and the method of bonding the joint 20 and the plate member 26.

In this way, the plate member 26 is joined to the preform 22 by bonding using the joint 20, and without using fasteners.

The material of the joint 20, the preform 22, and the plate member 26 is a composite material, for example, carbon fiber reinforced plastic (CFRP) or the like. In CFRP, carbon fiber is used as a reinforcing material, and a synthetic resin is used as a matrix. Note that this is not a limitation, and a metal such as aluminum alloy may be used as the material of the joint 20, the preform 22, and the plate member 26.

The joint 20 according to the present embodiment is formed with an inclined part 28 formed on a bonding surface 25 with the preform 22. The inclined part 28 is inclined with respect to a plane (horizontal plane, the direction B in FIG. 3) that is perpendicular to the direction (vertical direction, direction A in FIG. 3) in which a tensile load is applied to the plate member 26. In other words, the inclined part 28 is inclined towards the preform 22. Note that the inclined part 28 according to the present embodiment is inclined from edges 30 of the joint 20.

In addition, the inclined part 28 is formed from two inclined surfaces 28A, 28B. Also, a corner 32 is formed by the intersection of the inclined surfaces 28A, 28B. The corner 32 extends parallel to the lengthwise direction of the joint 20, in other words parallel to the edges 30 of the joint 20.

Also, a surface 34 (hereafter referred to as the "opposite surface") of the joint 20 opposite to the bonding surface 25 is inclined so that the thickness of the joint 20 becomes thinner from the center portion and tapers towards the edges 30.

On the other hand, an indented part 38 corresponding to the shape of the inclined part 28 is formed on the preform 22 so that the inclined part 28 of the joint 20 is embedded into a bonding surface 36 with the joint 20.

In this way, the joint 20 is bonded to the preform 22 with the inclined part 28 embedded in the preform 22.

Note that in the following description, the angle of the inclined surfaces 28A, 28B with respect to the direction B is defined as the inclination angle θ. Also, in the following description, the bonding surface 25 of the joint 20 and the bonding surface 36 of the preform 22 are collectively referred to as the bonding layer.

Next, the strength of the bonding layer (hereafter referred to as the "bond strength") is described with reference to FIGS. 6 to 10.

Figure 6:
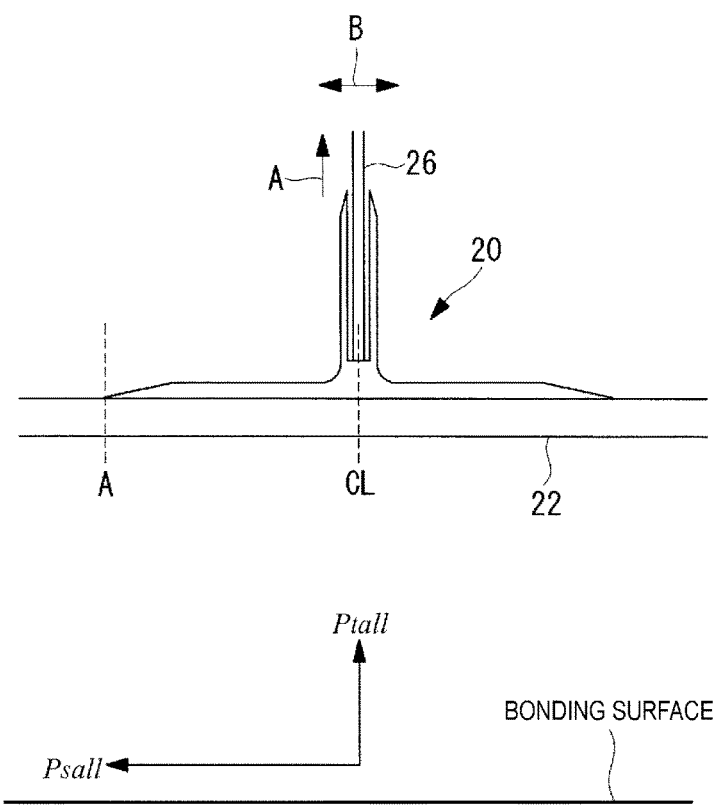
FIG. 6 is a schematic view illustrating the bond strength of a bonding layer in which an indented part is not formed in the preform.
Figure 7:
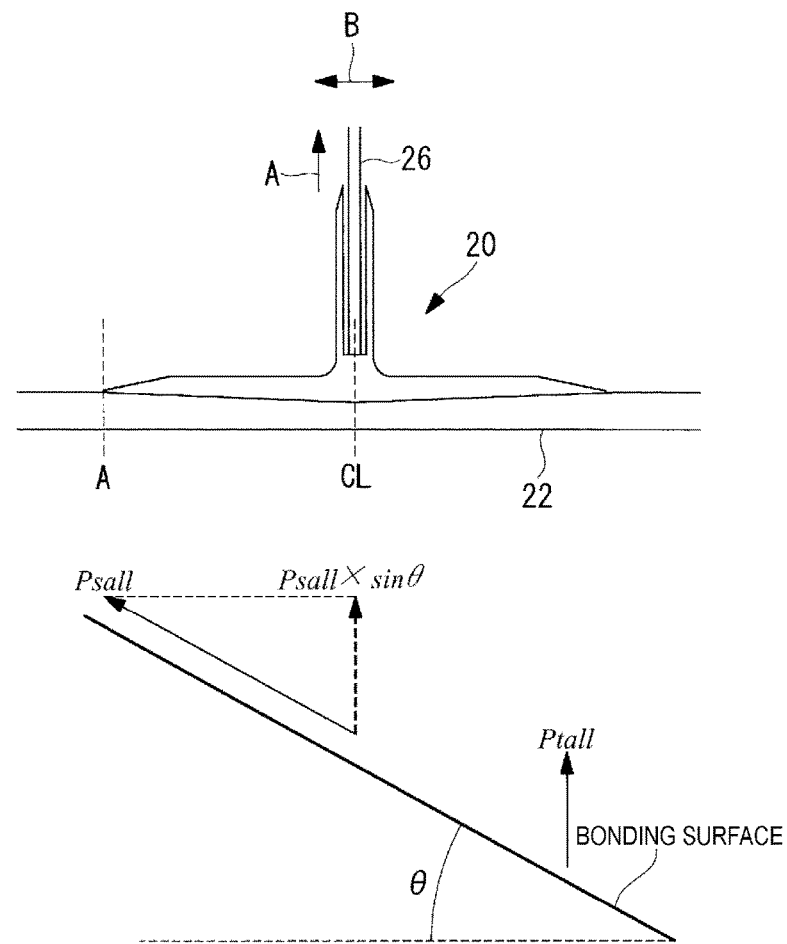
FIG. 7 is a schematic view illustrating the bond strength of a bonding layer according to an embodiment of the present invention.

FIG. 6 is a schematic view illustrating the bond strength of the bonding layer in which the indented part 38 is not formed in the preform 22. FIG. 7 is a schematic view illustrating the bond strength of the bonding layer in which the indented part 38 is formed in the preform 22.

The bond strength includes the out-of-plane direction strength Ptall, which is the strength in the tensile direction of the plate member 26 (the direction A in FIGS. 6 and 7, hereafter referred to as the "out-of-plane direction"). In other words, the out-of-plane direction strength Ptall is the strength against tensile loads applied to the plate member 26 (hereafter referred to as "out-of-plane direction loads").

In addition, besides the out-of-plane direction strength Ptall, the bond strength is divided into an in-plane direction strength Psall, which is the strength in the shear direction of the bonding layer (the direction B in FIGS. 6 and 7, hereafter referred to as the "in-plane direction").

As illustrated in FIG. 6, if the bonding layer is flat (inclination angle θ=0°), the out-of-plane direction strength Ptall and the in-plane direction strength Psall are orthogonal. Therefore, when the indented part 38 is not formed in the preform 22, the theoretical bond strength against out-of-plane direction loads Pall is equal to the out-of-plane direction strength Ptall, as indicated in Equation (1).

$$Pall = Ptall \quad (1)$$

On the other hand, when the indented part 38 is formed in the preform 22 and the bonding layer is inclined (inclination angle θ≠0°), the in-plane direction strength Psall has a strength component in the out-of-plane direction. Therefore the theoretical bond strength Pall against out-of-plane direction loads includes the sine component (Psall×sin θ) of the in-plane direction bond strength Psall in addition to the out-of-plane direction bond strength Ptall, as indicated in Equation (2).

$$Pall = Ptall + Psall \times \sin\theta \quad (2)$$

In other words, the bond strength is greater when the indented part 38 is formed in the preform 22 and the bonding layer is inclined, compared with when the bonding layer is flat.

Next, the results of numerical analysis of the stress produced in the bonding layer are described for the case in which the indented part 38 is formed in the preform 22, and the bonding layer is inclined. The numerical analysis was carried out using the finite element method.

Figure 8:
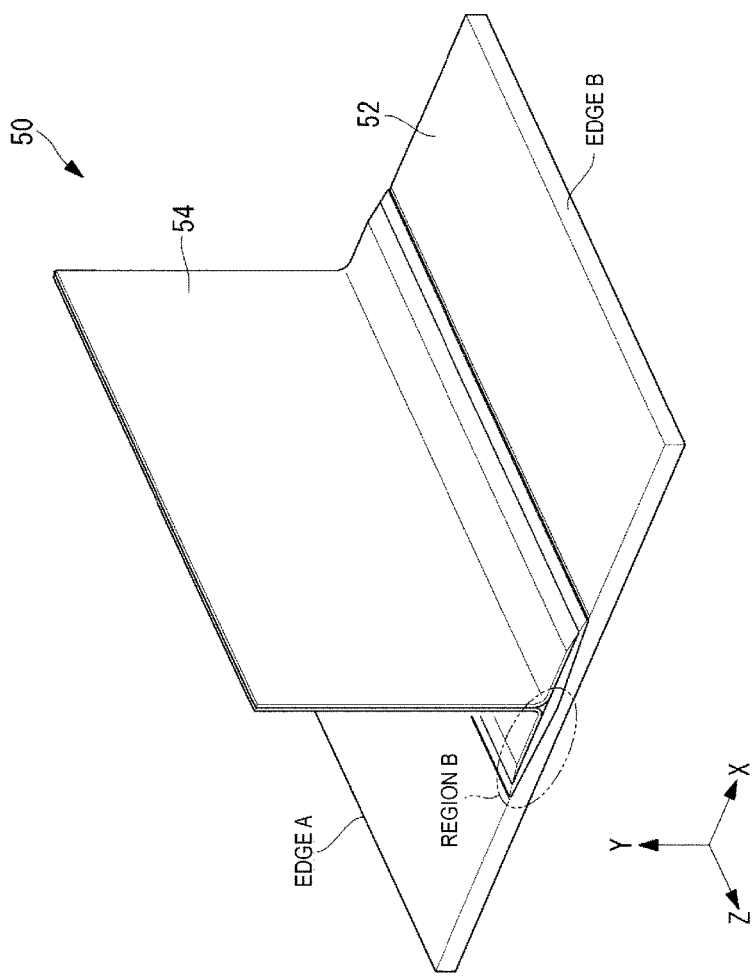
FIG. 8 illustrates the configuration of a numerical analysis model for calculating the stress produced in the bonding layer according to an embodiment of the present invention.
Figure 9:
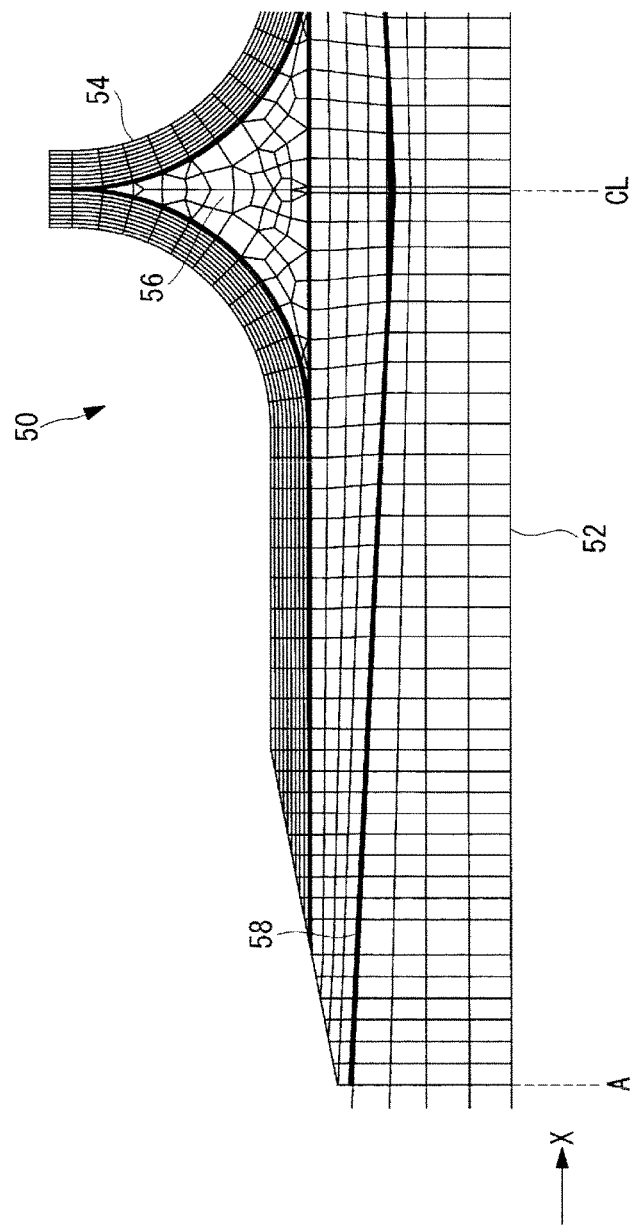
FIG. 9 is an enlarged view of the region B illustrated in FIG. 8.

FIG. 8 is an overall view of a numerical analysis model 50, and FIG. 9 is an enlarged view of the region B in FIG. 8.

As illustrated in FIGS. 8 and 9, the numerical analysis model 50 is formed from a preform model 52 in which the indented part 38 is formed, and a joint model 54 in which the inclined part 28 is formed. Note that the joint model 54 is a model of the joint 20 and the plate member 26 combined.

The numerical analysis conditions included constraints applied to both edges (edges A, B) of the preform model 52, and the load applied to the joint model 54 in the out-of-plane direction (out-of-plane direction load).

The material properties were as follows: for the composite material from which the preform model 52 and the joint model 54 were configured, E=about 60,000 MPa, for a gap filler model 56, E=about 40,000 MPa, and for a bonding layer model 58, E=about 3000 MPa. Note that E is the longitudinal elastic modulus (Young's modulus).

Also, numerical analysis was carried out under the same conditions with a numerical analysis model 50 formed from a preform model 52 in which the indented part 38 was not formed and a joint model 54 in which the inclined part 28 was not formed.

Figure 10:
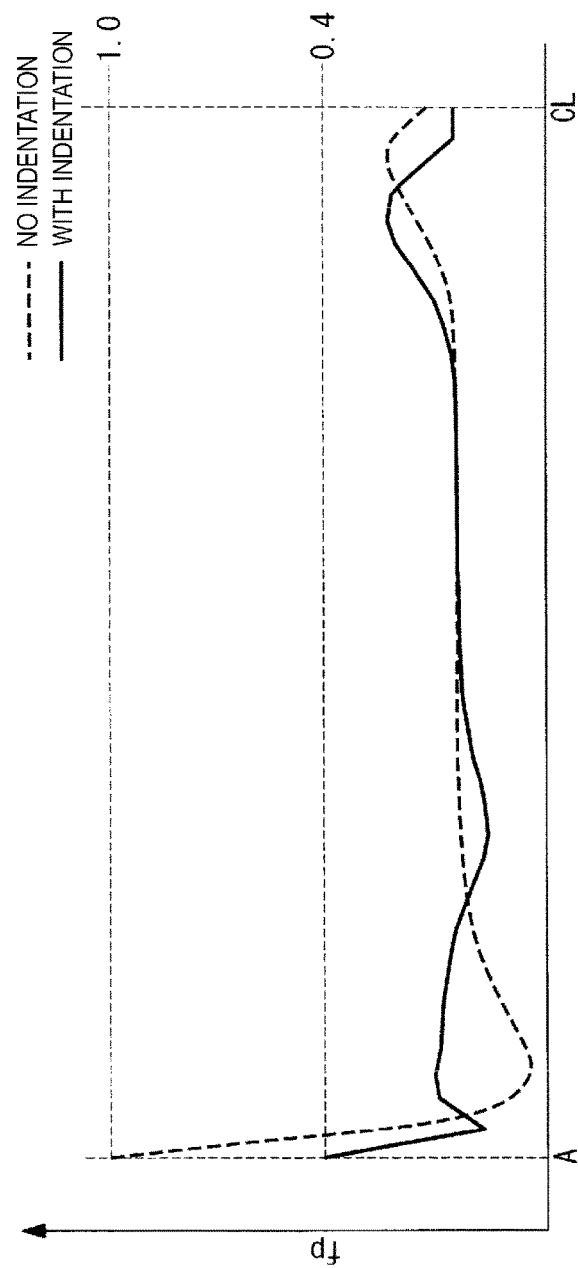
FIG. 10 is a graph showing the numerical analysis results for an embodiment of the present invention.

FIG. 10 is a graph showing the numerical analysis results. The broken line in FIG. 10 shows the numerical analysis results for the numerical analysis model 50 in which the indented part 38 is not formed in the preform 22. On the other hand, the continuous line shows the numerical analysis results for the numerical analysis model 50 in which the indented part 38 is formed in the preform 22. Also, the horizontal axis in FIG. 10 is the X direction of the numerical analysis model 50, the coordinate A indicates the edge of the bonding layer model 58, and the coordinate CL indicates the center of the bonding layer model 58 (see also FIG. 9). The vertical axis indicates the magnitude of the stress produced by the out-of-plane direction load.

As shown in FIG. 10, the peak stress is produced at the edge (coordinate A) of the bonding layer model 58 due to the out-of-plane direction load. The peak stress at the edge of the bonding layer model 58 (coordinate A) is smaller in the numerical analysis model 50 in which the indented part 38 is not formed compared with the numerical analysis model 50 in which the indented part 38 is formed. The reason for this is because the difference in stiffness between the preform 22 and the joint 20 is relieved by forming the indented part 38.

By forming the indented part 38 in the preform 22, the stress at the edge of the bonding layer model 58 is reduced by about 60% compared with the case in which the indented part 38 is not formed. In this way, by forming the indented part 38, the bond strength is improved overall by a factor of about 2.5.

Also, in the joint 20 according to the present embodiment, the opposite surface 34 is inclined towards the edge 30. In this way, in the joint 20 according to the present embodiment, the difference in stiffness between the joint 20 and the preform 22 is reduced compared with the case in which the edge 30 is, for example, perpendicular to the preform 22.

Note that there is a concern over the reduction in strength of the edge 30 because of inclination of the edge 30. However, by forming the inclined part 28 in the joint 20 and embedding it in the preform 22, the peak stress at the edge 30 is reduced when subjected to an out-of-plane direction load, as shown in FIG. 10, so damage to the edge 30 is minimized even when the opposite surface 34 is inclined towards the edge 30.

Also, the joint 20 according to the present embodiment is formed with the two inclined surfaces 28A, 28B, so the bond strength of the bonding surface 25 can be uniform on the left and right.

As described above, the joint 20 according to the present embodiment joins the plate member 26 to the preform 22, and the inclined part 28, which is inclined relative to a surface that is orthogonal to the direction in which a tensile load is applied to the plate member 26, is formed on the bonding surface 25 with the preform 22. Also, the indented part 38 corresponding to the shape of the inclined part 28 is formed on the preform 22 so that the inclined part 28 of the joint 20 is embedded into the indented part 38. The joint 20 is embedded in and bonded to the preform 22.

Therefore, with the joint 20 according to the present embodiment, the strength of the bonding surface between the joint 20 and the preform 22 can be increased.

First Modification

Hereinafter, a first modification of the present invention will be described.

Figure 11:
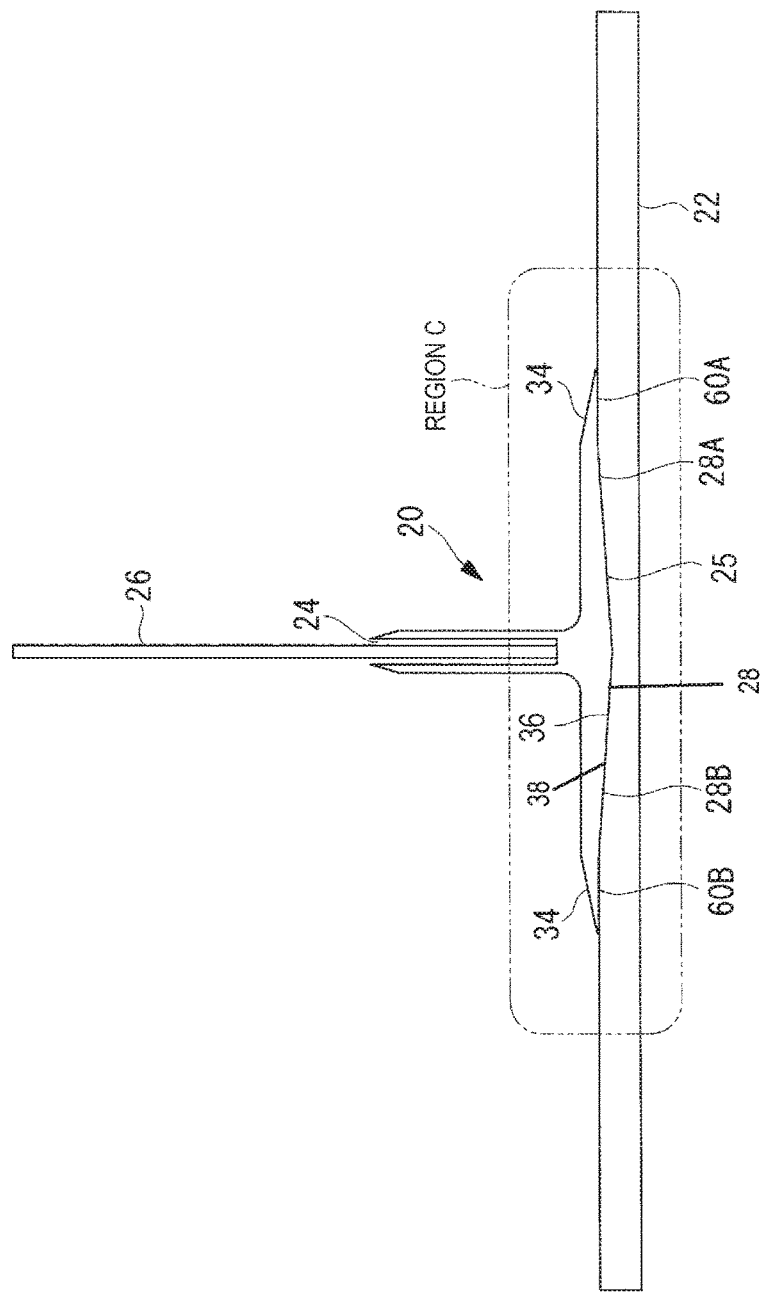
FIG. 11 is a side view illustrating the shape of the joint and the preform according to a first modification of the present invention.
Figure 12:
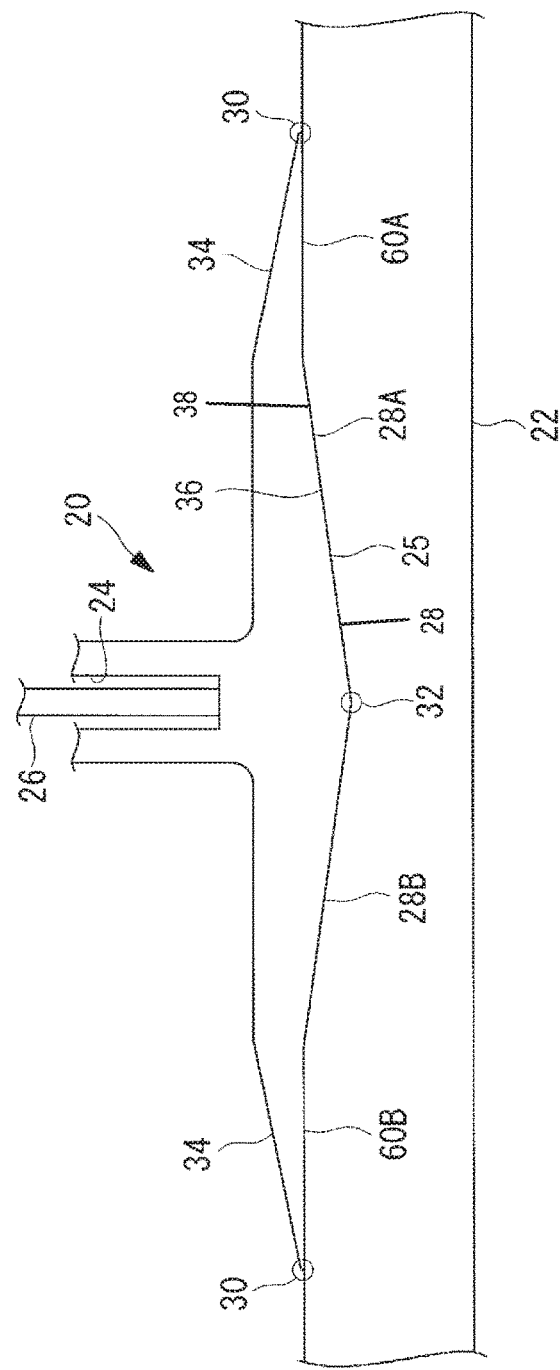
FIG. 12 is an enlarged view of the region C illustrated in FIG. 11.

FIG. 11 is a side view illustrating the shape of the joint 20 and the preform 22 according to the first modification of the present invention, and FIG. 12 is an enlarged view of the region C illustrated in FIG. 11. Note that constituent parts in FIGS. 11 and 12 that are the same as in FIGS. 3 and 4 are given the same reference signs as in FIGS. 3 and 4, and their description is omitted.

As illustrated in FIGS. 11 and 12, in the joint 20 according to the first modification, flat portions 60A, 60B are formed from the edges 30 of the bonding surface 25 towards the center direction of the joint 20, and the inclined surfaces 28A, 28B are formed from the edges of the flat portions 60A, 60B towards the center direction.

Second Modification

Hereinafter, a second modification of the present invention will be described.

Figure 13:
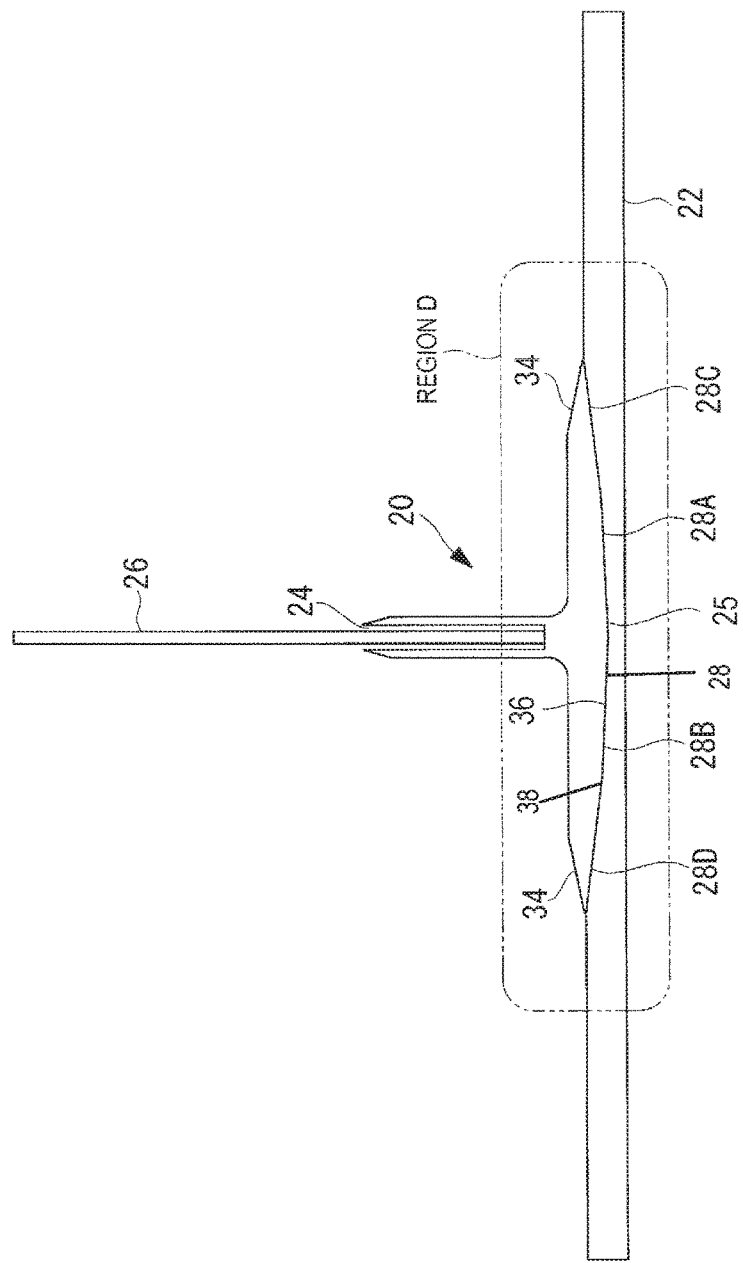
FIG. 13 is a side view illustrating the shape of the joint and the preform according to a second modification of the present invention.
Figure 14:
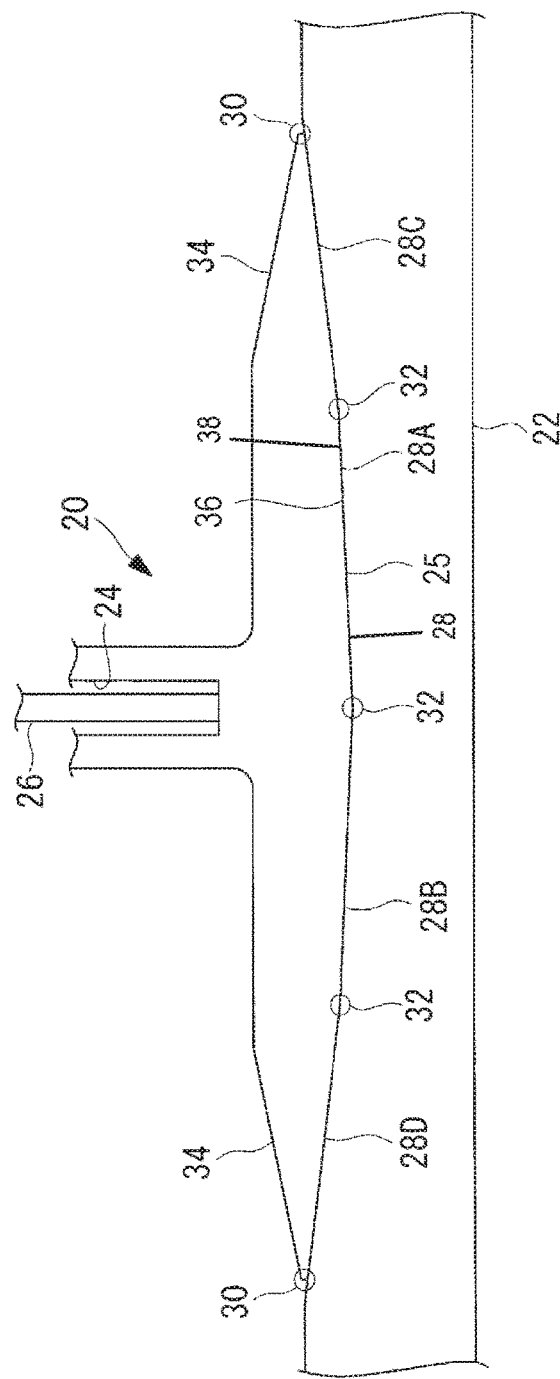
FIG. 14 is an enlarged view of the region D illustrated in FIG. 13.

FIG. 13 is a side view illustrating the shape of the joint 20 and the preform 22 according to the second modification of the present invention, and FIG. 14 is an enlarged view of the region D illustrated in FIG. 13. Note that constituent parts in FIGS. 13 and 14 that are the same as in FIGS. 3 and 4 are given the same reference signs as in FIGS. 3 and 4, and their description is omitted.

The inclined part 28 according to the third modification is formed with a plurality of inclined surfaces 28A, 28B, 28C, 28D with different inclination angles. Note that in the example in FIGS. 13 and 14, the inclined surface 28A and the inclined surface 28B have the same inclination angle, and the inclined surface 28C and the inclined surface 28D have the same inclination angle. However this is not a limitation, and the inclined part 28 may be formed with four or more inclined surfaces.

In this way, the inclination angle can be varied in accordance with the load that is expected to be applied to the joint 20, and the strength of the bonding surface 25 can be adjusted.

Third Modification

Hereinafter, a third modification of the present invention will be described.

Figure 15:
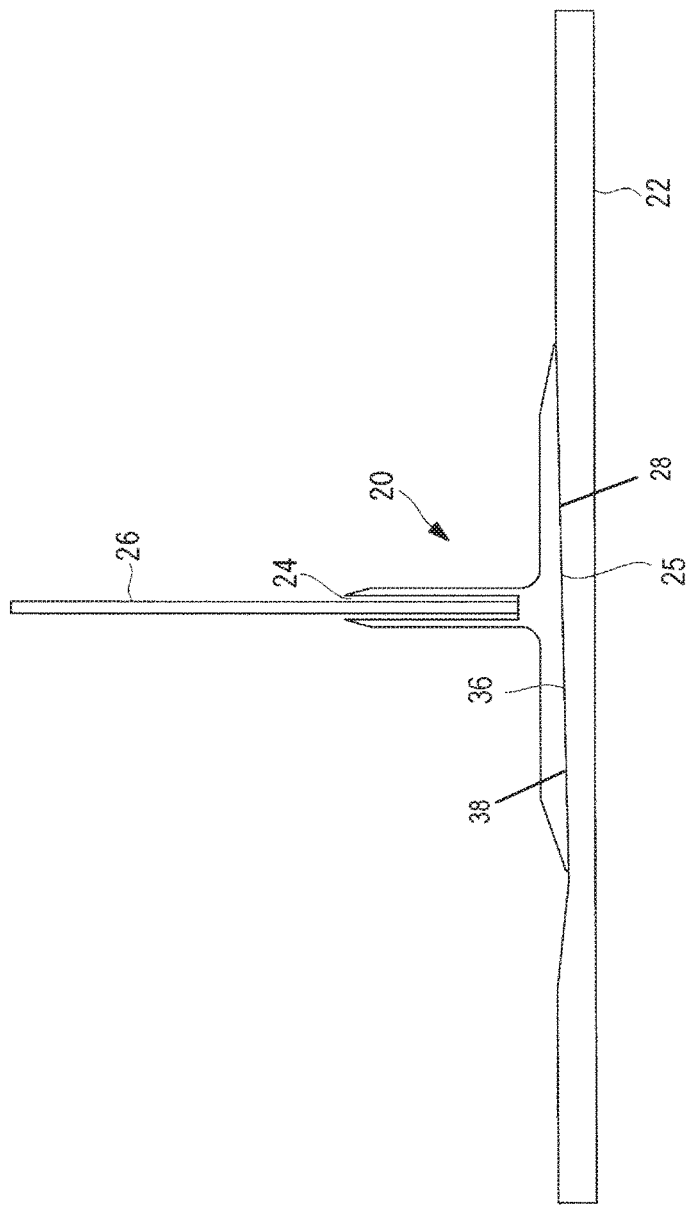
FIG. 15 is a side view illustrating the shape of the joint and the preform according to a third modification of the present invention.

FIG. 15 is a side view illustrating the shape of the joint 20 and the preform 22 according to the third modification of the present invention.

The inclined part 28 according to the third modification is formed with a single inclined surface.

In this way, with the joint 20 according to the third modification, the strength of the bonding surface 25 between the joint 20 and the preform 22 can be increased with a simple configuration.

Fourth Modification

Hereinafter, a fourth modification of the present invention will be described.

Figure 16:
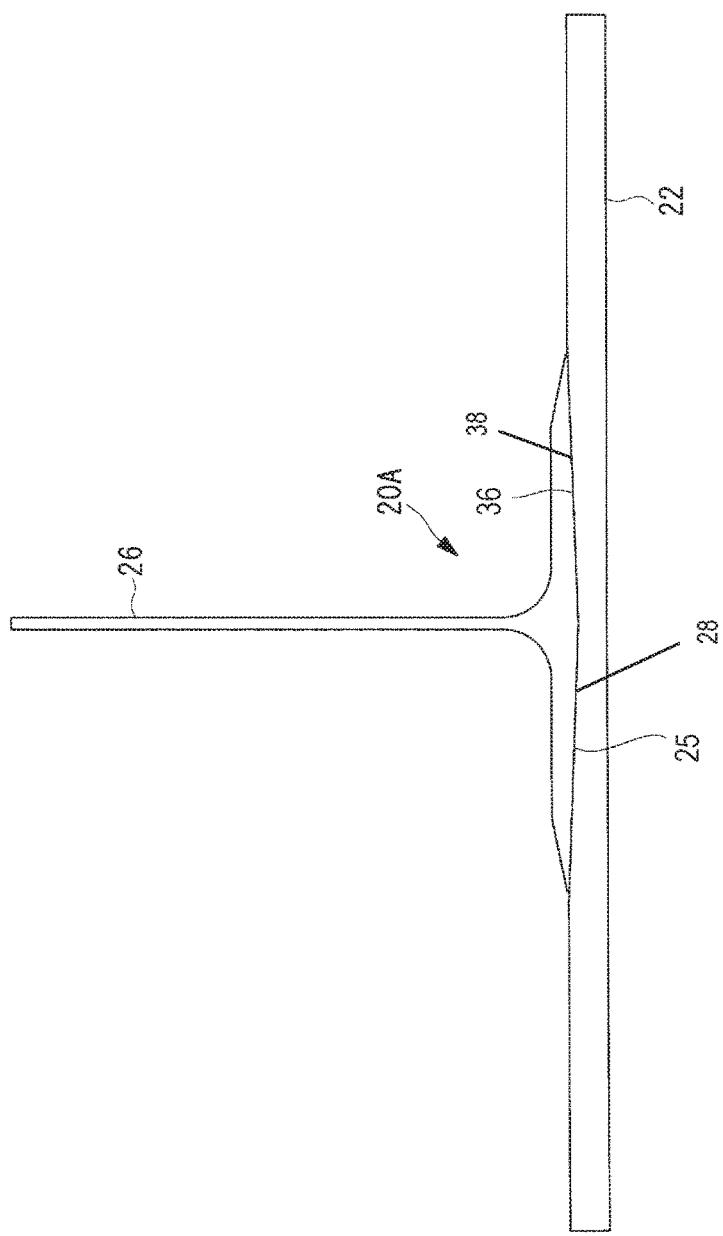
FIG. 16 is a side view illustrating the shape of the joint and the preform according to a fourth modification of the present invention.

FIG. 16 is a side view illustrating the shape of a joint 20A and the preform 22 according to the fourth modification of the present invention.

The joint 20A according to the fourth modification is a T-shaped joint, not a pi-shaped joint as described above.

Fifth Modification

Hereinafter, a fifth modification of the present invention will be described.

Figure 17:
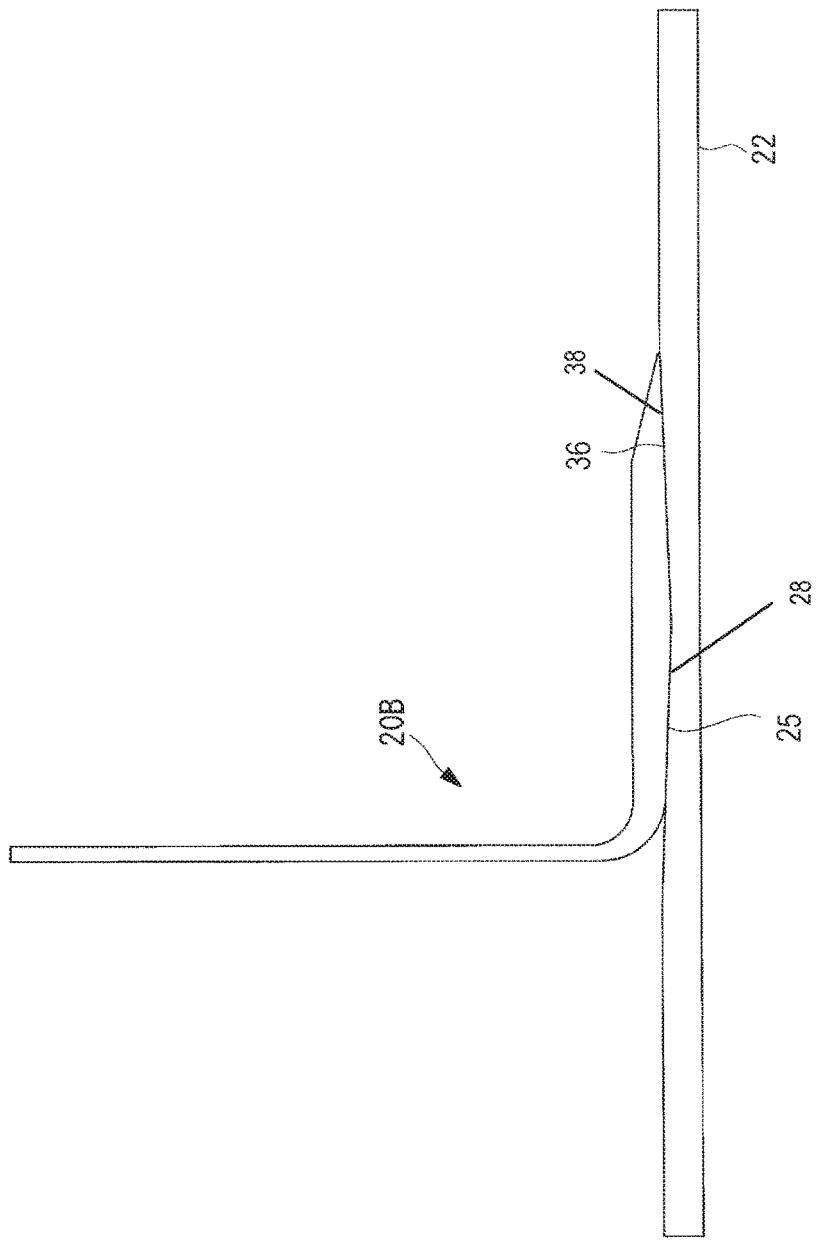
FIG. 17 is a side view illustrating the shape of the joint and the preform according to a fifth modification of the present invention.

FIG. 17 is a side view illustrating the shape of a joint 20B and the preform 22 according to the fifth modification of the present invention.

The joint 20B according to the fifth modification is an L-shaped joint, not a pi-shaped joint as described above.

The present invention has been described using the above embodiments, but the technical scope of the present invention is not limited to the scope of the embodiments as described above. Various modifications or improvements can be made to the embodiments as described above within the range that does not deviate from the intent of the invention, and these forms to which the modifications or improvements have been added are also included within the technical scope of the present invention.

For example, in the embodiments as described above, the joint 20 was described for a form used in an aircraft structure, but the present invention is not limited to this, and the joint 20 may be a form that is used in structures other than an aircraft.

REFERENCE SIGNS LIST

1 Main wing
20 Joint
22 Preform
25 Bonding surface
26 Plate member
28 Inclined part
38 Indented part

The invention claimed is:

1. A joint for connecting a member to a preform, the joint comprising:
   an inclined part inclined relative to a surface orthogonal to a direction in which a tensile load is to be applied to the member,
   wherein the inclined part is configured to be embedded in the preform and to be bonded to the preform, and is formed with a plurality of inclined surfaces.

2. The joint according to claim 1, wherein a surface opposite the inclined part is inclined toward an edge of the joint so that a thickness of the joint at the edge is thinner than a thickness of the joint at a center.

3. The joint according to claim 1, wherein the plurality of inclined surfaces are formed with different angles with respect to the preform.

4. An aircraft structure, comprising:
   a member;
   a preform; and
   a joint that is provided between the member and the preform, and that connects the member to the preform,
   wherein the joint includes an inclined part inclined relative to a surface orthogonal to a direction in which a tensile load is applied to the member,
   wherein the preform includes an indented part corresponding to a shape of the inclined part of the joint,
   wherein the inclined part of the joint is embedded in the indented part of the preform, and
   wherein the inclined part of the joint is bonded to the preform, and is formed with a plurality of inclined surfaces.

5. An assembly comprising:
   a member;
   a preform; and
   a joint that is provided between the member and the preform, and that connects the member to the preform,
   wherein the joint includes an inclined part inclined relative to a surface orthogonal to a direction in which a tensile load is applied to the member, and
   wherein the inclined part is embedded in the preform and bonded to the preform, and is formed with a plurality of inclined surfaces.

6. The assembly according to claim 5, wherein a surface opposite the inclined part is inclined toward an edge of the joint so that a thickness of the joint at the edge is thinner than a thickness of the joint at a center.

7. The assembly according to claim 5, wherein the plurality of inclined surfaces are formed with different angles with respect to the preform.

\* \* \* \* \*